United States Patent [19]

Iwasawa et al.

[11] Patent Number: 4,908,635

[45] Date of Patent: Mar. 13, 1990

[54] INK JET RECORDING APPARATUS WITH DENSITY CONTROL FUNCTION

[75] Inventors: Toshiyuki Iwasawa, Tokyo; Masayoshi Miura, Kawasaki, both of Japan

[73] Assignee: Matsushita Electric Industrial Co., Ltd., Osaka, Japan

[21] Appl. No.: 185,020

[22] Filed: Apr. 22, 1988

[30] Foreign Application Priority Data

Apr. 24, 1987 [JP] Japan ................................ 62-102254

[51] Int. Cl.[4] .......................... G01D 15/16; B41J 3/04

[52] U.S. Cl. ................................................ 346/140 R

[58] Field of Search .......................................... 346/140

[56] References Cited

U.S. PATENT DOCUMENTS 4,521,786 6/1985 Bain .................................... 346/140

4,555,717 11/1985 Miura .................................. 346/140

4,769,653 9/1988 Shimoda .............................. 346/140

*Primary Examiner*—Joseph W. Hartary

*Attorney, Agent, or Firm*—Pollock, VandeSande & Priddy

[57] ABSTRACT

A multi-nozzle type ink jet recording apparatus arranged so as to eject ink from each of a plurality of ink nozzles toward a writing surface by means of an electric field established due to an ink ejecting signal applied to each of the ink nozzles. The ink jet recording apparatus includes a circuit for generating a density information signal indicative of a recording density at every ink nozzle and a control unit being responsive to the density information signal and having a plurality of memories. Each of the plurality of memories stores a density-to-signal characteristic being predetermined to correspond to one or more of the ink nozzle and the density-signal characteristic represents the relation between the recording density and the ink ejecting signal indicative of an ink ejecting amount ejected from each of the ink nozzles. The control unit selects one from the density-to-signal characteristics at every ink nozzle and generating the ink ejecting signal indicative of the ink ejecting amount determined on the basis of the density information signal from the density information signal generating circuit in accordance with the selected density-to-signal characteristic, the generated ink ejecting signal being applied to the corresponding ink nozzle.

2 Claims, 5 Drawing Sheets

INK JET RECORDING APPARATUS WITH DENSITY CONTROL FUNCTION

BACKGROUND OF THE INVENTION

The present invention relates generally to ink jet recording apparatus, and more particularly to such an ink jet recording apparatus with a multi-nozzle type ink jet printing head which allows gradation control of the recording density when ink is ejected from each of a plurality of ink nozzles of the multi-nozzle type ink jet printing head toward a writing surface placed in opposed relation to the printing head.

Various types of ink jet printers have been devised heretofore and one known arrangement is to use a multi-nozzle ink jet printing head of the type wherein printing ink is ejected therefrom toward a writing surface by the aid of an electric field established between two types of electrodes and air-stream supplied from a pressurized air source. Such a multi-nozzle ink jet printing head is illustrated in U.S. Pat. No. 4,555,717, for example. An important problem in such multi-nozzle ink jet printing heads relates to the lack of uniformity in recording thickness or density on a writing surface. This is due to the difference in characteristic between the nozzles of the multi-nozzle ink jet printing head. Thus, a further improvement would be required from the viewpoint of prevention of recording density irregularity.

SUMMARY OF THE INVENTION

It is therefore an object of the present invention to provide a new and improved ink jet recording apparatus with a multi-nozzle type printing head which is capable of preventing the recording thickness irregularity due to the difference in characteristic between the nozzles of the multi-nozzle printing head.

An ink jet recording apparatus according to the present invention has a multi-nozzle type ink jet printing head comprising a plurality of ink nozzles and electrode means composed of a common electrode and a plurality of control electrodes which are positioned so as to be in opposed relation to the common electrode and each of which is provided in correspondence with each of the plurality of ink nozzles. Each of the plurality of ink nozzles ejects ink toward a writing surface in response to an ink ejecting signal applied to the corresponding control electrode. The ink jet recording apparatus further includes a control unit for controlling generation of the ink ejecting signal applied thereto which control unit selects one of predetermined density-signal characteristics and generating an ink ejecting signal on the basis of an input signal indicative of a required recording density in accordance with the selected density-signal characteristic, the ink ejecting signal being a pulse signal whose width is indicative of the required recording density, i.e., ejecting amount of ink ejected toward the writing surface from the corresponding ink nozzle.

In accordance with the present invention, there is provided an ink jet printer comprising: ink jet printing head means having a plurality of ink nozzles each ejecting ink toward a writing surface; means for storing a plurality of predetermined density-application signal characteristics each representing the relation between a required rècording density and an ink ejecting signal to be applied to each of the plurality of ink nozzles; and control means for selecting one from the plurality of predetermined density-application signal characteristics in correspondence with each of the plurality of ink nozzles and generating the ink ejecting signal in accordance with the selected density-application signal characteristic.

In accordance with the present invention, there is further provided an ink jet recording apparatus with a multi-nozzle type ink jet printing head having a plurality of ink nozzles and electrode means so as to eject ink from each of the plurality of ink nozzles toward a writing surface by means of an electric field established due to an ink ejecting signal applied to the electrode means, the ink jet recording apparatus comprising: density determining means for determining a recording density at every ink nozzle of the multi-nozzle type ink jet printing head and generating a density information signal; and control means responsive to the density determining means and having memory means storing a plurality of density-to-signal characteristics each being predetermined to correspond to one or more of the ink nozzles and each representing the relation between the recording density and the ink ejecting signal indicative of an ink ejecting amount ejected from each of the plurality of ink nozzles, for selecting one from the density-to-signal characteristics at every ink nozzle and generating the ink ejecting signal indicative of the ink ejecting amount determined on the basis of the density information signal from the density determining means in accordance with the selected density-to-signal characteristic, the ink ejecting signal being applied to the electrode means.

BRIEF DESCRIPTION OF THE DRAWINGS

The present invention will be described in further detail with reference to the accompanying drawings, in which.

DETAILED DESCRIPTION OF THE INVENTION

Prior to describing an embodiment of the present invention, a brief description of a conventional ink jet printing apparatus will first be made with reference to FIGS. 1 to 4 for a better understanding of the present invention.

Figure 1:
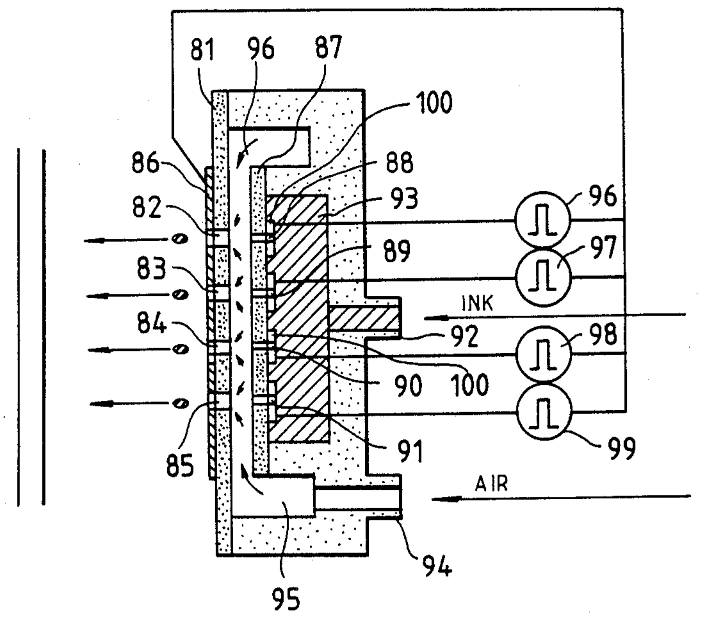
FIG. 1 PRIOR ART
FIG. 1 is a cross-sectional view showing a multi-nozzle type ink jet printing head which may be employed for an ink jet recording apparatus according to an embodiment of the present invention.

A prior multi-nozzle ink jet printing head, as shown in FIG. 1, comprises an insulating air-ink nozzle plate 81 having a plurality of air-ink nozzles 82 to 85 successively arranged in a row at a predetermined interval. A common electrode 86 is attached at the circumferential portions of the plurality of air-ink nozzles 82 to 85 to a surface of the insulating air-ink nozzle plate 81. In parallel to the air-ink nozzle plate 81 is provided an ink nozzle plate 87 having a plurality of ink nozzles 88 to 91 successively arranged in a row and aligned with; .the air-ink nozzles 82 to 85 with one-to-one correspondence therebetween. The respective ink nozzles 88 to 91 are coupled to an ink chamber 93 with ink which is in turn coupled through an ink supply passage 92 to an ink source, not shown. On the other hand, the respective air-ink nozzles 82 to 85 are coupled through an air chamber 95 and an air supply passage 94 to an air source, not shown so that air supplied from the air supply passage 94 makes an air stream 96 because of the ink nozzle plate 87 and is then discharged curvedly from the air-ink nozzles 82 to 85. Control electrodes 100 whose number corresponding to the number of the ink nozzles 88 to 91 are independently provided at the circumferential portions of the ink nozzles 88 to 91 and on the rear surface of the ink nozzle plate 87 facing the ink chamber 93. An electric field is established between the common electrode 86 and the control electrodes 100 to form meniscuses in the ink nozzles 88 to 91 and, in response to selective application of ink-ejection control signals 96' to 99 to the control electrodes 100, the meniscuses in the selected ink nozzles are extended toward the air-ink nozzles 82 to 85 and carried by the airstream 96 so as to be ejected as ink droplets from the corresponding air-ink nozzles.

Figure 2:
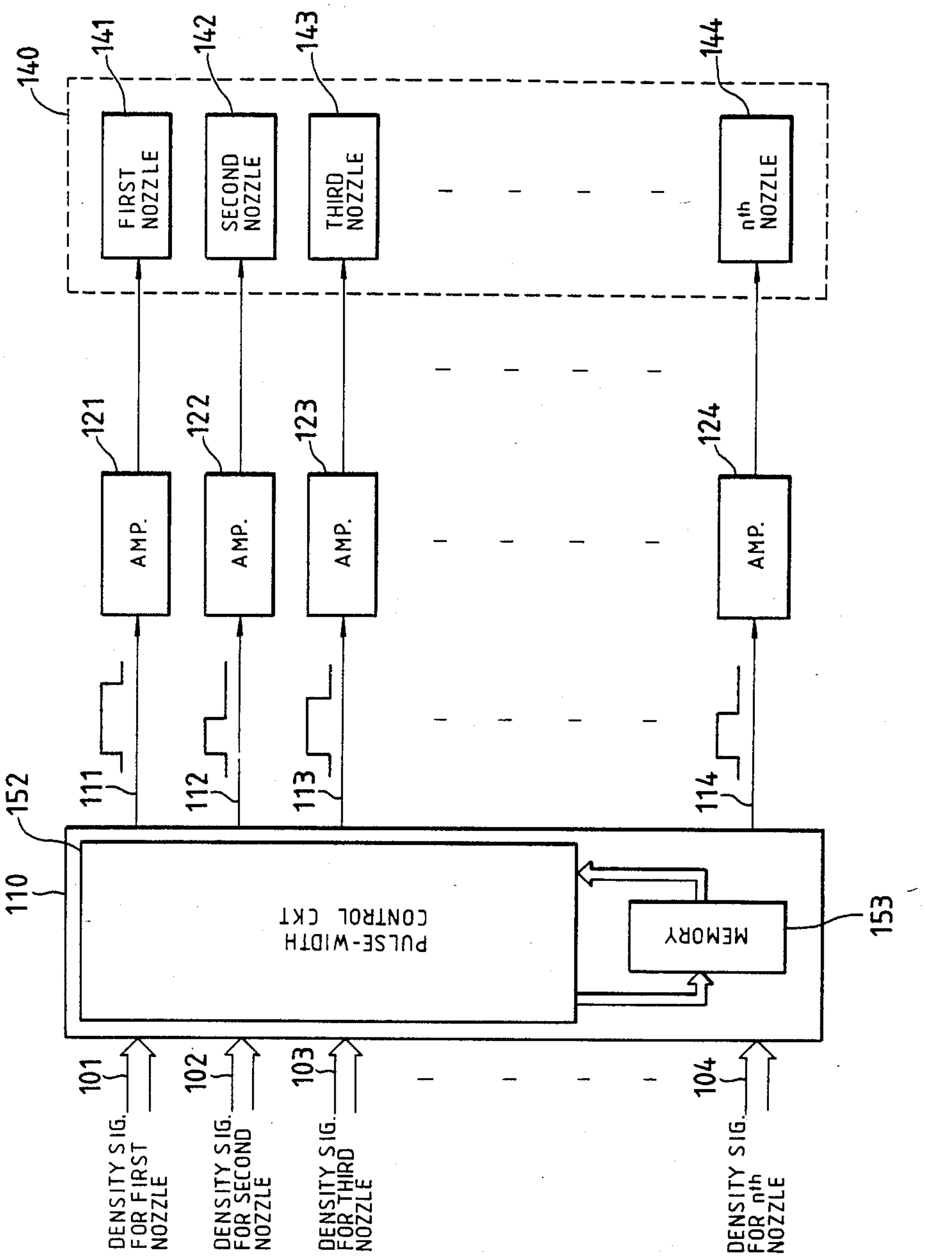
FIG. 2 PRIOR ART
FIG. 2 is a block diagram showing a conventional ink ejecting signal generation control circuit.
Figure 3:
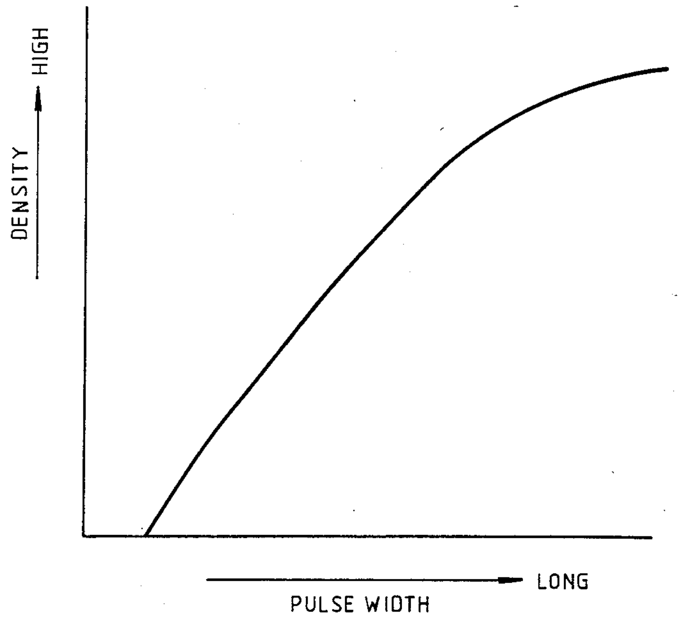
FIG. 3 PRIOR ART
FIG. 3 is a graphic diagram showing a density-to-pulse width of the ink ejecting signal used in the conventional ink ejecting signal generation control circuit of FIG. 2.

This type ink jet printing head is arranged to cause ink to discharge due to an electrostatic force produced in response to the application of the ink-ejection control signals 96' to 99 which are pulse signals, respectively. The ink-discharging amount, i.e., recording density, is substantially proportional to the pulse width, or length, of each of the ink-ejection control signals applied to the control electrodes 100 and thus controllable under control of the pulse width thereof. One known ink-ejection control arrangement will be described hereinbelow with reference to FIG. 2 which is a block diagram showing a device for generating the ink-ejection control pulse signals which are in turn applied to n ink nozzles of a multi-nozzle type ink jet printing head such as illustrated in FIG. 1. In FIG. 2, the control pulse generating device 110 comprises a pulse width control circuit 152 which produces pulse signals 111 to 114 with pulse widths corresponding to N-bit input signals 101 to 104 respectively having information relating to the recording densities in correspondence with the respective ink nozzles 141 to 144 of the multi-nozzle type ink jet printing head 140. The produced pulse signals 111 to 114 are respectively supplied through amplifiers 121 to 124 to the control electrodes of the ink nozzles 141 to 144. Also included in the control pulse generating device 110 is a memory 153 which stores density-pulse width characteristic curves as illustrated in FIG. 3.

Figure 4:
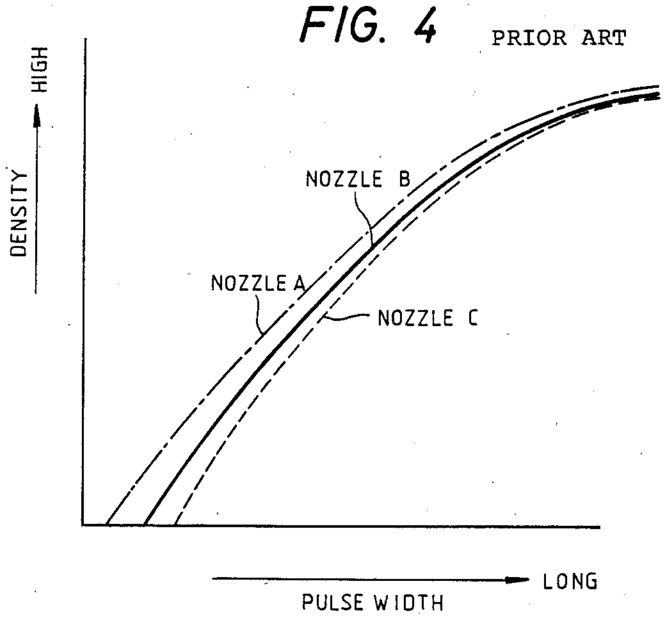
FIG. 4 PRIOR ART
FIG. 4 is a graphic illustration for describing the difference in density-pulse width characteristic between the ink nozzles of a multi-nozzle type ink jet printing head.

In operation, in response to inputs of the N-bit density input signals 101 to 104, the memory is controlled to convert them into l-bit pulse width information signals respectively corresponding to the inputted density input signals 101 to 104 which are in turn supplied to the pulse width control circuit 152 which produces the corresponding one-bit pulse width signals 111 to 114 and supplies them through the amplifiers 121 to 124 to the control electrodes of the ink nozzles 141 to 144, resulting in ink discharges with amounts corresponding to the density information. However, this arrangement causes recording density irregularity irrespective of application of control signals with the same pulse width, because of the difference in the density-pulse width characteristic between the ink nozzles as shown in FIG. 4.

Figure 5:
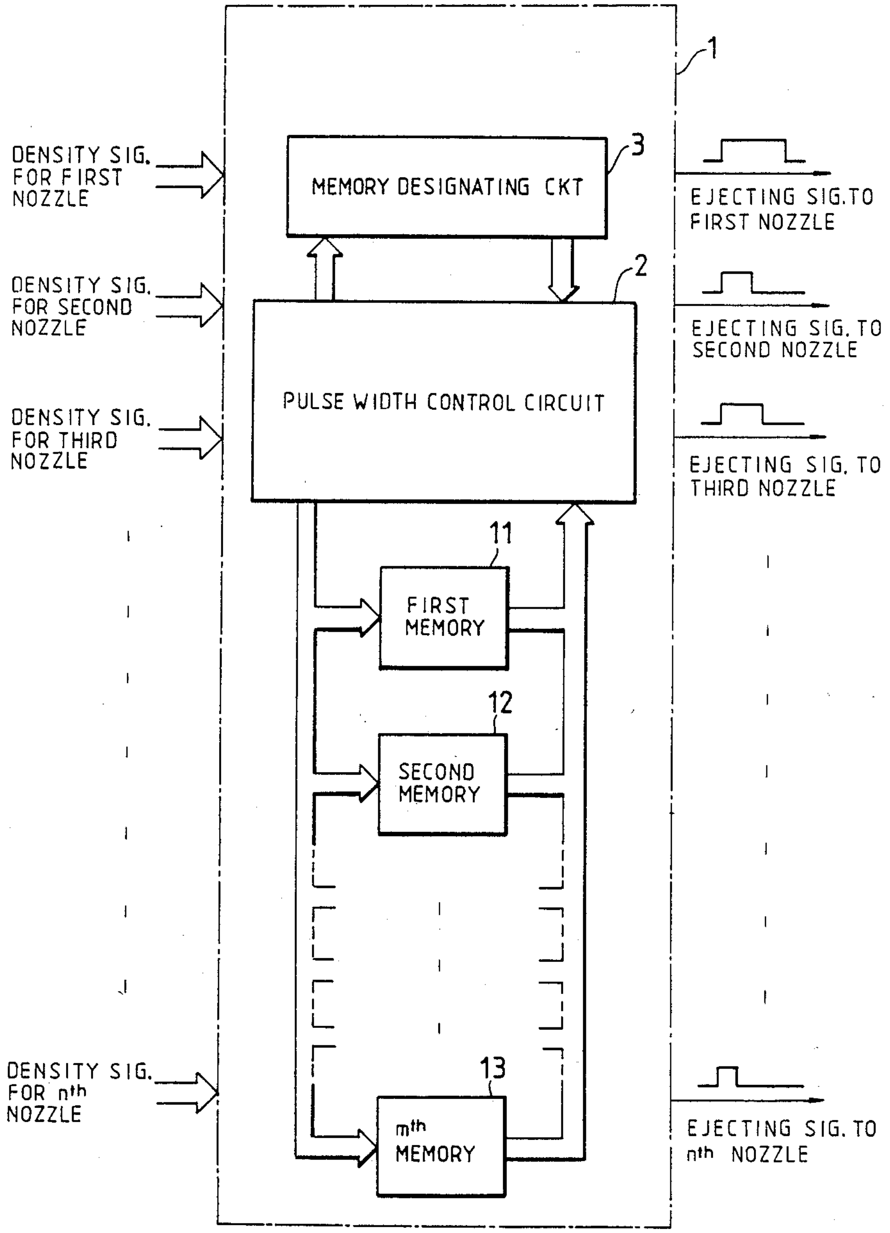
FIG. 5 is a block diagram showing a pulse-width control circuit of the ink jet recording apparatus in accordance with embodiment of the present invention.
Figure 6:
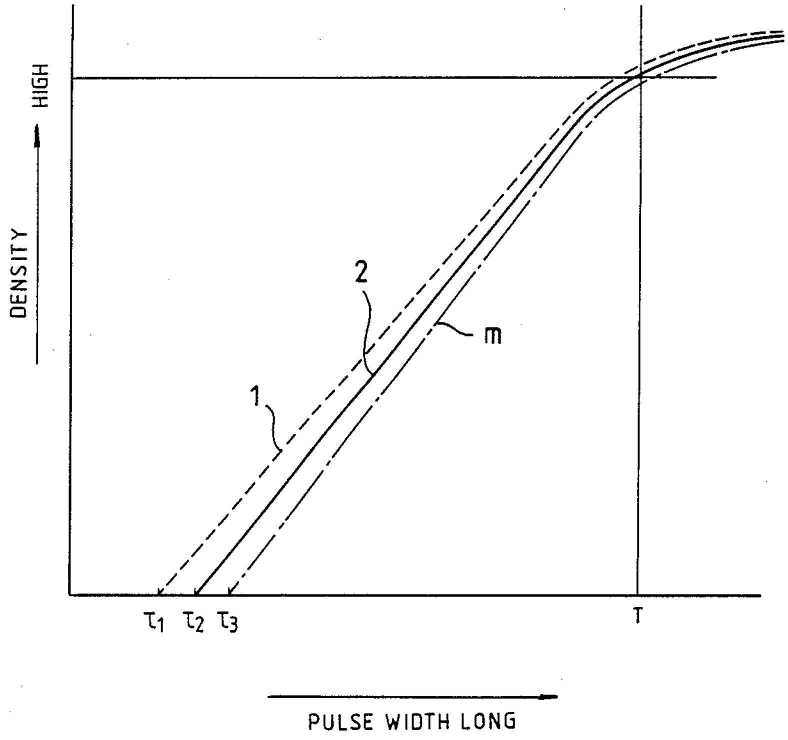
FIG. 6 is a graphic diagram showing density-to-pulse width characteristics used in the pulse-width control circuit of FIG. 5.

Referring now to FIG. 5, there is illustrated a control pulse generating unit according to an embodiment of the present invention designated at numeral 1, which may be coupled to a multi-nozzle type ink jet printing head such as shown in FIG. 1 and which comprises a pulse width control circuit 2 for, at every ink nozzle, producing a pulse signal with the width corresponding to an N-bit density information signal inputted from the external circuit. Also included in the control pulse generating unit 1 are a first memory 11 to an $m^{th}$ memory 13 (m = integer not less than 2) which store density-pulse width characteristic curves as shown in FIG. 6, respectively. Although it is better in general that a density-pulse width characteristic curve is determined at every ink nozzle so that the number n of the ink nozzles equals the number m of the density-pulse width characteristic curves, it is sufficient in practice that m density-pulse width characteristic curves are prepared and one of the m density-pulse width characteristic curves is selected to be closer to the density-pulse characteristic curve of each of the n ink nozzles ($n > m$).

Illustrated at numeral 3 is a memory designating circuit for specifying memories in correspondence with the ink nozzles, respectively, which is externally presettable. In the memory designating circuit 3 are preset and stored addresses of the memories 11 to 13 which respectively prestore the density-pulse width characteristic curves corresponding to the respective ink nozzles of a multi-nozzle type ink jet printing head used in this ink jet recording apparatus. In response to inputting of each of N-bit density information signals for the respective ink nozzles to the control pulse generating unit 1, the memory designating circuit generates a k-bit memory address signal on the basis of each of the density information signals at every nozzle and the pulse width control circuit 2 obtains a l-bit pulse width information signal on the basis of each of the density information signals and the density-pulse width characteristic curve stored in the corresponding memory (k and l are positive integers). The pulse width control circuit 2 further produces a one-bit pulse signal with width corresponding to each of the pulse width information signals which is in turn supplied, to the control electrode of each of the ink nozzles after being amplified by amplifying means.

It should be understood that the foregoing relates to only a preferred embodiment of the present invention, and that it is intended to cover all changes and modifications of the embodiment of the invention herein used for the purposes of the disclosure, which do not constitute departures from the spirit and scope of the invention.

What is claimed is:

1. An ink jet recording apparatus comprising:

an ink jet head which includes a plurality of ink nozzles, a plurality of air nozzles each disposed in opposite relation with each of said ink nozzles, means for discharging air flow from said air nozzles and means for applying an electric field between said air nozzles and ink in said ink nozzles;

density determining means for determining a recording density at every ink nozzle of said plurality of ink nozzles and generating a density information signal; and control means responsive to said density determining means and having memory means storing a plurality of density-to-signal characteristics each being predetermined to correspond to said plurality of ink nozzles and each representing the relation between the recording density and an ink ejecting signal to be applied to one of said ink nozzles, for selecting a characteristic from said density-to-signal characteristics at every ink nozzle and generating said ink ejecting signal indicative of an ink ejecting amount determined on the basis of said density information signal from said density determining means in accordance with the selected density-to-signal characteristic, said ink ejecting signal being applied to the electric field applying means;

wherein said ink ejecting signal is a pulse signal having a constant amplitude and a pulse width designated on the basis of said density information signal in accordance with the selected density signal characteristic.

2. An ink jet recording apparatus as claimed in claim 1, wherein said electric field applying means comprises a common electrode provided on a surface of a plate on which said plurality of air nozzles are formed, and a plurality of control electrodes each being provided in correspondence with each of said plurality of ink nozzles and positioned in opposed relation to said common electrode, said pulse signal having a pulse width corresponding to said density information signal being applied to the corresponding control electrode.

* * * * *